United States Patent
Segarra

(10) Patent No.: US 9,711,051 B2
(45) Date of Patent: Jul. 18, 2017

(54) METHOD OF DETERMINING THE POSITION OF A VEHICLE IN A TRAFFIC LANE OF A ROAD AND METHODS FOR DETECTING ALIGNMENT AND RISK OF COLLISION BETWEEN TWO VEHICLES

(71) Applicant: RENAULT s.a.s., Boulogne-Billancourt (FR)

(72) Inventor: Gerard Segarra, Le Mesnil Saint Denis (FR)

(*) Notice: Subject to any disclaimer, the term of this patent is extended or adjusted under 35 U.S.C. 154(b) by 0 days.

(21) Appl. No.: 15/209,525

(22) Filed: Jul. 13, 2016

(65) Prior Publication Data
US 2016/0321928 A1 Nov. 3, 2016

Related U.S. Application Data

(63) Continuation of application No. 14/376,242, filed as application No. PCT/EP2013/052090 on Feb. 1, 2013, now abandoned.

(30) Foreign Application Priority Data

Feb. 3, 2012 (FR) ...................................... 12 00327

(51) Int. Cl.
*G06K 9/00* (2006.01)
*G08G 1/16* (2006.01)
(Continued)

(52) U.S. Cl.
CPC ......... *G08G 1/167* (2013.01); *G06K 9/00798* (2013.01); *G08G 1/09626* (2013.01);
(Continued)

(58) Field of Classification Search
CPC ............... G08G 1/167; G08G 1/09626; G08G 1/09716; G08G 1/096783; G08G 1/163; G08G 1/096758; G06K 9/00798
See application file for complete search history.

(56) References Cited

U.S. PATENT DOCUMENTS 6,819,779 B1 11/2004 Nichani
6,946,978 B2 9/2005 Schofield
(Continued)

FOREIGN PATENT DOCUMENTS

EP 1 901 259 3/2008
EP 2 012 088 1/2009
(Continued)

OTHER PUBLICATIONS

French Search Report Issued Oct. 5, 2012 in Application No. FR 1200327 Filed Feb. 3, 2012.
(Continued)

*Primary Examiner* — John Strege
(74) *Attorney, Agent, or Firm* — Oblon, McClelland, Maier & Neustadt, L.L.P.

(57) ABSTRACT

A method for determining a positioning of a subject motor vehicle in a traffic lane of a highway is provided, including: acquiring a number of traffic lanes of the highway; acquiring an image of the highway showing at least a lateral part of the highway; acquiring a datum relating to a direction of travel of the subject motor vehicle on the highway; receiving by the subject motor vehicle one message from another motor vehicle, the message including a first information item relating to a positioning of the other motor vehicle, and a second information item relating to a direction of travel of the other motor vehicle; and deducting the positioning of the subject motor vehicle in one of the traffic lanes, as a function of the number of traffic lanes, the datum, the acquired image, the first and second information item.

11 Claims, 2 Drawing Sheets

(51) Int. Cl.
*G08G 1/0967* (2006.01)
*G08G 1/0962* (2006.01)

(52) U.S. Cl.
CPC . *G08G 1/096716* (2013.01); *G08G 1/096758* (2013.01); *G08G 1/096783* (2013.01); *G08G 1/163* (2013.01)

(56) References Cited

U.S. PATENT DOCUMENTS

| | | | |
|---|---|---|---|
| 7,379,815 | B2 | 5/2008 | Kobayashi |
| 2004/0167717 | A1 | 8/2004 | Buchanan |
| 2005/0240342 | A1 | 10/2005 | Ishihara |
| 2006/0031008 | A1 | 2/2006 | Kimura et al. |
| 2007/0198188 | A1 | 8/2007 | Leineweber et al. |
| 2009/0012709 | A1 | 1/2009 | Miyazaki |
| 2009/0118994 | A1 | 5/2009 | Mori et al. |
| 2009/0306852 | A1 | 12/2009 | Ikeda |
| 2010/0052884 | A1 | 3/2010 | Zeppelin |
| 2010/0076684 | A1 | 3/2010 | Schiffmann |
| 2010/0121518 | A1 | 5/2010 | Tiernan |
| 2010/0315217 | A1 | 12/2010 | Miura et al. |
| 2010/0322476 | A1 | 12/2010 | Kanhere |
| 2011/0018737 | A1 | 1/2011 | Hsu |
| 2011/0222732 | A1 | 9/2011 | Higuchi |
| 2013/0151058 | A1 | 6/2013 | Zagorski |
| 2014/0303845 | A1 | 10/2014 | Hartmann |

FOREIGN PATENT DOCUMENTS

| | | |
|---|---|---|
| EP | 2 264 683 | 12/2010 |
| JP | 2000-76599 A | 3/2000 |
| JP | 2005-339117 A | 12/2005 |
| JP | 2006-23278 A | 1/2006 |
| JP | 2006-300534 A | 11/2006 |
| JP | 2010-152675 A | 7/2010 |
| JP | 2011-7736 A | 1/2011 |

OTHER PUBLICATIONS

International Search Report Issued May 13, 2013 in PCT/EP13/052090 Filed Feb. 2, 2013.

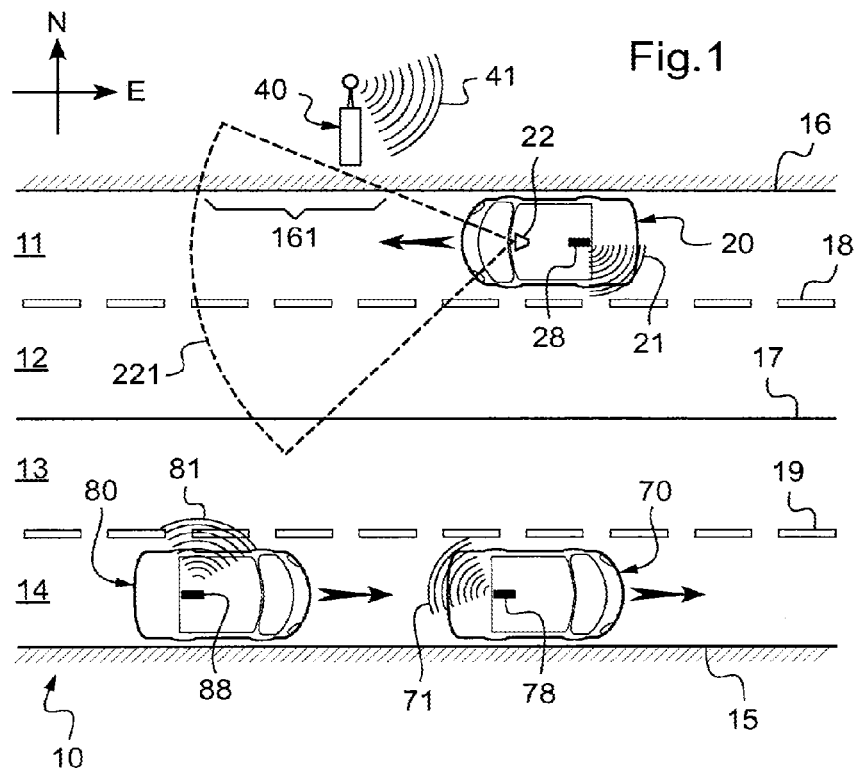
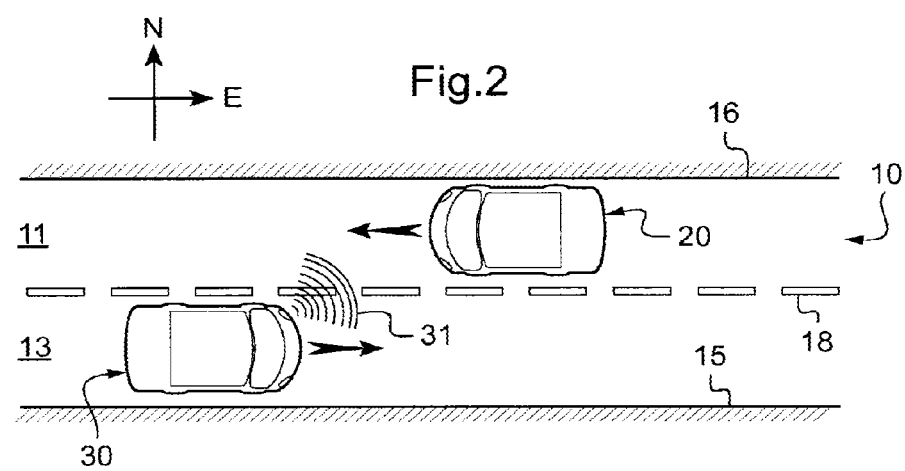

METHOD OF DETERMINING THE POSITION OF A VEHICLE IN A TRAFFIC LANE OF A ROAD AND METHODS FOR DETECTING ALIGNMENT AND RISK OF COLLISION BETWEEN TWO VEHICLES

CROSS-REFERENCE TO RELATED APPLICATIONS

This application is a continuation application of U.S. application Ser. No. 14/376,242 filed Aug. 1, 2014, which is the U.S. National Stage application of PCT International Application No. PCT/EP13/052090 filed Feb. 1, 2013, which claims priority to French Application No. 1200327 filed Feb. 3, 2012. The entire contents of each are herein incorporated by reference in their entirety.

TECHNICAL FIELD TO WHICH THE INVENTION RELATES

The present invention relates generally to motor vehicles (cars, motorbikes, trucks, coaches, etc.).

It relates more particularly to a method of determining the positioning of a motor vehicle in a traffic lane of a highway.

The invention is particularly advantageously applicable in the production of collision risk management systems, for which it is essential to reliably detect a current or potential alignment of two motor vehicles.

TECHNOLOGICAL BACKGROUND

Satellite geolocation systems, called "GNSS" systems (Global Navigation Satellite System) are now very widely used in motor vehicles. These systems are more often than not incorporated in a navigation system which in turn comprises a set of global digital maps, then making it possible to guide a driver to the desired destination. Geolocation systems that can be cited by way of example are the North American GPS system (global positioning system), the Russian GLONASS system or the European GALILEO system.

Similarly, driving assistance systems have expanded in recent years, with a consequential improvement in road safety and driving comfort.

For example, the document US 20110106442 discloses a motor vehicle equipped with a collision avoidance system. This avoidance system is designed to process information received from a GPS appliance, from a motion sensor and from a device situated on the roadside and transmitting topographical information in order to predict the future trajectory of said vehicle. The system is thus configured to be able to provide warnings or undertake actions in order to avoid collision between said motor vehicle and other motor vehicles.

In order to detect, with a high level of confidence, a risk of collision between a "subject" motor vehicle and another, "target" motor vehicle, it is essential to have a relative positioning accuracy between the two motor vehicles of less than a meter. Now, a GPS appliance cannot position the motor vehicle with an absolute accuracy better than 3 to 5 meters, which is scarcely sufficient. Even if our GPS appliance were to be of the type that is coupled to a network of terrestrial stations (in which case the concept of "differential" GPS comes into play), the absolute positioning accuracy obtained would still be insufficient. In effect, the latter is of the order of 2 to 6 meters in Europe, and then only in good satellite transmission conditions. This is why the use, alone, of a satellite positioning system does not make it possible to sensitively detect the longitudinal alignment between two vehicles traveling on the same highway.

OBJECT OF THE INVENTION

In order to remedy the abovementioned drawback of the prior art, the present invention proposes a method for determining the positioning of a subject motor vehicle in a traffic lane of a highway, that can be implemented easily and inexpensively.

More particularly, according to the invention, a method is proposed for determining the positioning of a subject motor vehicle in a traffic lane of a highway, comprising steps of:
a) acquiring the number of traffic lanes of said highway,
b) acquiring an image of said highway showing at least a lateral part of said highway,
c) acquiring a datum relating to the direction of travel of said subject motor vehicle on said highway, and
d) deducing the positioning of said subject motor vehicle in one of the traffic lanes of said highway, as a function of the number of traffic lanes, of the datum relating to the direction of travel, and of the acquired image.

Thus, by virtue of the invention, it is possible to detect, with high reliability, the positioning of the subject motor vehicle in one of the traffic lanes of the highway.

This information can then be used in different ways. It can notably make it possible to detect a longitudinal alignment of the subject motor vehicle with another motor vehicle, in order, for example, to avoid a collision with this other motor vehicle.

In effect, before generating a warning informing a driver of a risk of longitudinal collision (at the front in the case of two vehicles traveling in different directions, and at the rear or at the front in the case of two vehicles traveling in the same direction), it is possible, by virtue of the invention, to check that the two vehicles involved are indeed in longitudinal alignment, that is to say that the subject and target motor vehicles are positioned in the same traffic lane of a highway. If this were not the case, there would be the risk of sending false alarms (a case referred to as "false positive"), or else of not sending an alarm (a case called "false negative").

This positioning information of the motor vehicle in a traffic lane could also be used otherwise.

It could, for example, make it possible to display, on the screen of the GPS appliance, on the one hand, the exact positioning of the vehicle in one of the traffic lanes of the highway, in order to more accurately guide the driver and, on the other hand, the speed limit applicable to the traffic lane in which the vehicle is traveling.

This information could also be used by an information system which broadcasts the phases of the traffic lights to the vehicles traveling in a given traffic lane. These phases may be different for the traffic lanes of one and the same highway or at intersections between highways. This can be exploited for different applications, such as, for example, the detection of a traffic light violation, the optimization of green light crossing speeds ("green wave"), or systems for automatically stopping and restarting the engine at traffic lights (systems called, for example, "stop and start").

It should be noted that the method according to the invention does not necessarily use a geolocation system to determine the positioning of the subject motor vehicle on the highway.

In addition to the development of advanced driving assistance systems, we are also witnessing the gradual deployment of cooperative road systems as part of the development of smart transport systems. These cooperative systems enable motor vehicles traveling in proximity to one another to communicate with one another, for example by radio waves by the protocol defined by the IEEE 802.1 1p International Standard. This vehicle-to-vehicle communication, also called "V2V" communication, allows for the exchange of standardized messages (CAM, for "cooperative awareness messages"), each message sent by a vehicle containing, for example, different information relating to the vehicle (geolocation, speed, heading, direction of travel, etc.) and to its environment.

Then, advantageously, prior to step d), there can be provided a step of receiving, by said subject motor vehicle, at least one message from at least one other motor vehicle, said message containing, on the one hand, a first information item relating to the positioning of said other motor vehicle in one of said traffic lanes of said highway, and, on the other hand, a second information item relating to the direction of travel of said other motor vehicle on said highway, and, in step d), the positioning of said subject motor vehicle in one of said traffic lanes of said highway is deduced as a function also of said first and second information items.

Moreover, other advantageous and nonlimiting features of the determination method according to the invention are as follows:

said second information item is a heading datum;
said second information item comprises at least two successive geolocation coordinates of said other motor vehicle;
in step a), there are provided an operation of acquiring the geolocation coordinates of said subject motor vehicle, an operation of reading a global digital map in which highways are stored and, for each highway, the corresponding number of traffic lanes, and an operation of deducing the number of traffic lanes of said highway as a function of the acquired geolocation coordinates and of the global digital map read.
in step a), said subject motor vehicle receives and processes a signal which is sent by a highway-side unit and which comprises at least the number of traffic lanes of said highway,
prior to step d), there is provided a step of acquiring a change of traffic lane datum of said subject motor vehicle on said highway, and, in step d), the positioning of said subject motor vehicle in one of said traffic lanes of said highway is deduced as a function also of said change of traffic lane datum of said subject motor vehicle on said highway.

The invention also proposes a method of detecting longitudinal alignment between a first subject motor vehicle and a second subject motor vehicle, comprising:

an operation of determining the positioning of said first subject motor vehicle in a traffic lane of a highway by a determination method as mentioned above,
an operation of determining the positioning of said second subject motor vehicle in one of the traffic lanes of said highway by a determination method as mentioned above,
an operation of sending, by said first subject motor vehicle, and of receiving by said second subject motor vehicle, a message containing the positioning of said first subject motor vehicle in one of the traffic lanes of said highway, and
if the second subject motor vehicle and the first subject motor vehicle are positioned in the same traffic lane of said highway, an operation of detecting a longitudinal alignment of said first and second subject motor vehicles.

The invention also proposes a method of detecting a risk of longitudinal collision between a first subject motor vehicle and a second subject motor vehicle, comprising:

an operation of detecting, by the second subject motor vehicle, a longitudinal alignment with the first subject motor vehicle by a method of detecting longitudinal alignment as mentioned above,
an operation of sending, by said first subject motor vehicle, and of receiving by said second subject motor vehicle, a message containing the speed and the direction of travel of said first subject motor vehicle,
a step of acquiring, by the second subject motor vehicle, its speed and its direction of travel, and
if a longitudinal alignment is detected between said first subject motor vehicle and said second subject motor vehicle, an operation of detecting a risk of collision between said first subject motor vehicle and said second subject motor vehicle as a function of the respective positionings, speeds and directions of travel of said first and second subject motor vehicles.

The invention also describes a motor vehicle comprising:

a means of acquiring the number of traffic lanes of the highway on which said motor vehicle is traveling,
a means of acquiring an image of said highway, showing at least a lateral part of said highway, and
a means of acquiring a datum relating to the direction of travel of said motor vehicle on said highway, characterized in that it also comprises a driver unit suitable for implementing a determination method as mentioned above.

DETAILED DESCRIPTION OF AN EXEMPLARY EMBODIMENT

The following description in light of the attached drawings, given as nonlimiting examples, will give a clear understanding of what the invention consists of and how it can be produced.

In the attached drawings:

FIG. 1 is a schematic view of three motor vehicles according to the invention, traveling in traffic lanes of a highway;

FIG. 2 is a schematic view of two motor vehicles according to the invention, traveling in opposite directions on two traffic lanes of one and the same highway;

By way of preamble, it will be noted that the identical or corresponding elements of the different embodiments represented in the different figures will be referred to by the same reference symbols and will not be described each time.

Figure 3:
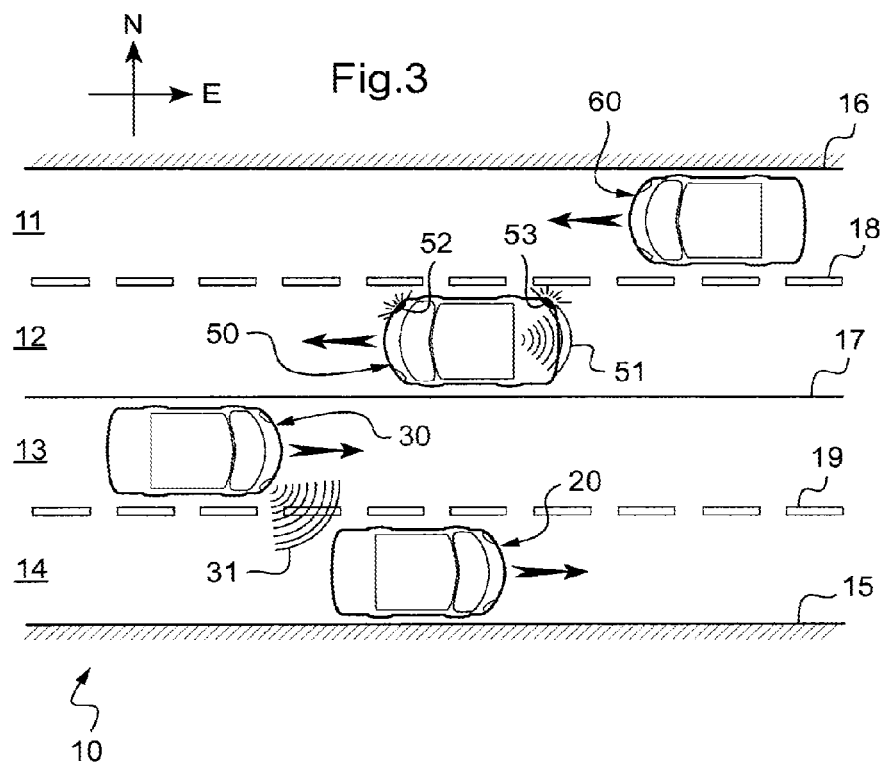
FIG. 3 is a schematic view of four motor vehicles according to the invention, traveling on four traffic lanes of a highway identical to that of FIG. 1.

In the figures, the case where legislation imposes driving on the right, as is the case for example in France or in the United States, will be considered.

FIG. 1 shows a highway 10 which comprises four traffic lanes 11, 12, 13, 14 and which is delimited, on one side, by a first roadside 15, and, on the other side, by a second roadside 16.

This highway 10 is divided into two by a central reservation 17, which separates two first traffic lanes 11, 12 from two second traffic lanes 13, 14. The first two traffic lanes 11, 12 are called "west traffic lanes", given the direction of travel of the motor vehicles which travel westward thereon. The two second traffic lanes 13, 14 are called "east traffic lanes" in light of the direction of travel of the motor vehicles which travel eastward thereon.

The two "west traffic lanes" 11, 12 are separated by a marking on the ground 18 here consisting of a broken white strip. Similarly, the two "east traffic lanes" 13, 14 are separated by a marking on the ground 19 here consisting of a broken white strip.

A roadside unit 40 is also provided here, situated outside of the highway 10, in proximity to the first roadside 15. This roadside unit 40 is then designed to broadcast, continuously or at short and regular intervals, messages 41 intended for the motor vehicles traveling on the highway 10. It is, moreover, designed in such a way that these messages can be received by any motor vehicle traveling in proximity to said roadside unit 40, within a radius which is at least greater than the width of the highway 10. Here, the radius within which the messages 41 are broadcast is at least 300 meters.

The messages 41 contain at least the number of traffic lanes of the highway 10 alongside which the roadside unit 40 is placed.

The motor vehicles 20, 70, 80 represented in FIG. 1 (and those represented in FIGS. 2 and 3) are, here, conventional motor vehicles in as much as they comprise four wheels, a chassis, a windshield provided with a rearview mirror, and an engine.

On the other hand, they are distinguished from ordinary motor vehicles in that they are each equipped:
 with a means of acquiring the number of traffic lanes of the highway 10 (or more specifically the number of traffic lanes of the portion of highway on which the motor vehicle is running),
 with a means of acquiring an image of the highway 10 showing at least a lateral part 161 of the highway 10, and
 with a means of acquiring a datum relating to their direction of travel on the highway 10.

The architecture of the motor vehicle 20, called subject motor vehicle, will more particularly be described here. It will obviously be considered that the other vehicles represented in different figures have the same characteristics.

Figure 4:
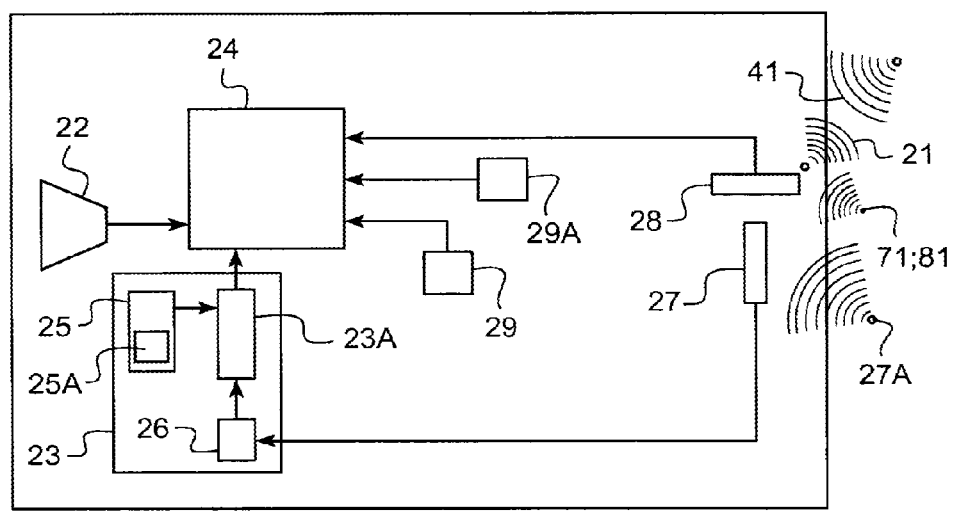
FIG. 4 is a schematic view of the electronic 10 equipment with which the motor vehicles represented in FIGS. 1 to 3 are equipped.

As represented in FIG. 4, the acquisition means with which the subject motor vehicle 20 is equipped to enable it to acquire the number of traffic lanes of the highway 10 here comprises an onboard navigation system 23.

This navigation system 23 comprises a global digital map 25 in which is stored topographic and road infrastructure information 25A.

Such topographic and road infrastructure information 25*a* here comprises an indicator of the type of highway (highway, road, etc.), an indicator concerning the possibility of overtaking, the positions of points of intersection with other highways, the number of traffic lanes and the direction of travel of each of the traffic lanes.

The navigation system 23 also comprises a satellite geolocation system 26, here of GPS type, supplying the GPS position of the subject motor vehicle 20. This satellite geolocation system 26 is coupled to a GPS antenna 27 capable of picking up signals 27A from the satellites of the GPS system, to enhance the reception of the satellite geolocation system 26.

The navigation system 23 also comprises a processing unit 23A capable of extracting, as a function of the GPS position of the subject motor vehicle 20, the topographic and road infrastructure information 25A contained in the global digital map 25.

For its part, the acquisition means with which the subject motor vehicle 20 is equipped to enable it to acquire images of the highway 10 here comprises a camera 22 situated behind the windshield of the subject motor vehicle 20, at the level of the rear-view mirror.

This camera 22 is designed, positioned, oriented and set in such a way as to be able to acquire images of at least a right lateral part of the highway 10, in particular here a part 161 of the second roadside 16 situated to the right of the subject motor vehicle 20, as is represented in FIG. 1.

Here, preferentially, the camera 22 is arranged in such a way that its field of view 221 enables it to acquire an image of a part of the highway 10 situated in front of the subject motor vehicle 20 and on either side thereof. The camera 22 is thus designed to acquire an image not only of a part 161 of the second roadside 16, but also of a part of the ground marking 18 and of a part of the central reservation 17.

As represented in FIG. 4, the acquisition means with which the subject motor vehicle 20 is equipped to enable it to acquire a datum relating to the direction of travel of this vehicle here consists of an electronic compass 29 designed to indicate the heading of the subject motor vehicle 20. This electronic compass 29 is here represented as not being incorporated in the navigation system 23. Provision could obviously be made for it to be included therein.

Preferentially, the subject motor vehicle 20 is, moreover, also equipped with a transceiver 28 capable of receiving messages 41 from the roadside unit 40, of receiving messages 71, 81 from other motor vehicles, and of sending messages 21 to other motor vehicles.

This transceiver 28 is designed to send messages 21 likely to be picked up by only the motor vehicles 70, 80 located in proximity to the subject motor vehicle 20, here with a range of at least 300 meters.

The subject motor vehicle 20 is also equipped with vehicle parameter measurement means 29A, making it possible in particular to measure the speed of the subject motor vehicle 20, the position of the brake pedal, the position of the indicator actuation lever, and the angle of the steering wheel.

The subject motor vehicle 20 also comprises a driver unit 24.

This driver unit 24 comprises a processor (CPU), a random-access memory (RAM), a read-only memory (ROM), analog-digital converters (A/D), and various input and output interfaces.

As FIG. 4 shows, by virtue of its input interfaces, the driver unit 24 is suitable for receiving, from the 30 navigation system 23, the topographic and road infrastructure information 25A. It is also suitable for receiving messages picked up by the transceiver 28, a heading angle measured by the electronic compass 29, and the vehicle parameters measured by the measurement means 29A.

By virtue of its output interfaces, the driver unit 24 is, moreover, suitable for controlling an audible warning, as is described in more detail hereinafter in this explanation.

As a variant, the driver unit can, for example, drive a human-machine interface (HMI), that can combine a number of warning sources, of audible, visual, or haptic type.

By virtue of its processor and according to a particularly advantageous feature of the invention, the driver unit 24 is suitable for determining the positioning of the subject motor vehicle 20 in one of the traffic lanes 11, 12, 13, 14 of the highway 10, by implementing steps:

a) of acquiring the number of traffic lanes 11, 12, 13, 14 of the highway 10, b) of acquiring an image showing at least a lateral part 161 of the second roadside 16, c) of acquiring a datum relating to the direction of travel of the subject motor vehicle 20, and d) of deducing the positioning of the subject motor vehicle 20 in one of the traffic lanes 11, 12, 13, 14.

Here, these steps a) to d) are implemented in a broader method, which comprises three successive operations and which makes it possible to detect, with a high degree of reliability, a risk of longitudinal collision with another motor vehicle.

This method will be described below in its entirety, and not only the above steps a) to d).

The first operation consists, for the driver unit 24, in determining the positioning of the subject motor vehicle 20 in one of the traffic lanes 11, 12, 13, 14 of the highway 10, by following the abovementioned steps a) to d)).

Thus, during a first step (step a), the driver unit 24 acquires the number of traffic lanes on the highway 10.

For this, the driver unit 24 sends a request to the navigation system 23 of the subject motor vehicle 20.

As has been described previously with reference to FIG. 4, the processing unit 23A of the navigation system 23 then reads the GPS position of the subject motor vehicle 20 supplied by the satellite geolocation system 26, then extracts from the global digital map 25 the number of traffic lanes of the highway 10, and all the topographic and road infrastructure information 25A stored in the global digital map 25.

In effect, knowing the GPS position of the subject motor vehicle 20 with an accuracy of around 3 to 5 meters, the navigation system 23 can determine, on the global digital map 25, which highway 10 closest to this position is the one on which it is probable that the subject motor vehicle 20 is traveling.

The navigation system then transmits all of this information to the driver unit 24.

Thus, in the situation represented in FIG. 1, the driver unit 24 stores, in its random access memory, the fact that the highway 10 has four traffic lanes 11, 12, 13, 14 separated two by two by the central reservation 17.

If the transceiver 28 of the subject motor vehicle 20 receives messages 41 from the roadside unit 40, the driver unit 24 implements a second step. This second step is redundant with the first step, and it makes it possible to check the results of this first step.

During this second step, the driver unit 24 processes the messages 41 received from the roadside unit 41 to extract therefrom the number of traffic lanes of the highway 10.

The driver unit 24 then matches this datum with that determined on completion of the first step. If these data do not match, only the one obtained from the messages 41 is taken into account in the rest of the method.

As a variant, the subject motor vehicle does not have any navigation system but is equipped only with a transceiver receiving messages from a roadside unit. In this case, only the second step described previously is implemented for the acquisition of the number of traffic lanes of the highway.

The third step (step b) consists in acquiring an image of at least a lateral part of the highway 10.

It is implemented after the first or the second step, depending on whether the transceiver 28 of the subject motor vehicle 20 has or has not received messages 41 from a roadside unit.

During this third step, the driver unit 24 sends a request to the camera 22 which then acquires an image of the highway 10 and transmits this image to the driver unit 24.

The driver unit 24 then processes this image in order to determine the number of traffic lanes separating the subject motor vehicle 20 from the second roadside 16 (which can be seen in the right lateral part of the image of the highway 10).

In the example represented in FIG. 1, the driver unit 24 of the subject motor vehicle 20 here determines that there is no traffic lane between the subject motor vehicle 20 and the second roadside 16 of the highway 10.

Thus, the driver unit 24 determines that the subject motor vehicle 20 is on one of the outside traffic lanes 11, 14 without being able to determine whether it is the west traffic lane 11 or the east traffic lane 14.

For this, the driver unit 24 acquires, in a fourth step (step c), a datum relating to the direction of travel of the subject motor vehicle 20 on the highway 10.

To this end, the driver unit 24 sends a request to the electronic compass 29 which, in return, supplies it with a heading angle.

In the case of the subject motor vehicle 20 represented in FIG. 1, the electronic compass 29 supplies a heading angle of 270°.

Thus, during a fifth step (step d), the driver unit 24 deduces therefrom that the subject motor vehicle 20 is traveling toward the west and is therefore located on the west traffic lane 11.

The second operation implemented by the driver unit 24 of the subject motor vehicle 20 consists in processing the signals sent by the motor vehicles 70, 80 located in proximity in order to determine whether the subject motor vehicle 20 is longitudinally aligned with another vehicle.

Before sending such signals, the driver unit of each of the first and second motor vehicles 70, 80 determines, by the method previously described, the traffic lane 11, 12, 13, 14 on which this motor vehicle 70, 80 is located.

In the case in point, the driver unit of each of the first and second motor vehicles 70, 80 determines that the corresponding motor vehicle is located on the east traffic lane 14.

By virtue of the transmission/reception systems 78, 88 with which these first and second motor vehicles 70, 80 are equipped, the driver units of these vehicles can send messages 71, 81 containing at least the speed of these vehicles, the traffic lane on which these vehicles are located, and the directions of travel of these vehicles.

These messages 71, 81 are sent at regular intervals, for example every 100 milliseconds.

After having received these messages 71, 81, the driver unit 24 processes the information that they contain so as to check whether the motor vehicles 70, 80 are located on the west traffic lane 11.

In this case, here, the driver unit 24 detects that no motor vehicle situated in proximity to the subject motor vehicle 20 is traveling on the west traffic lane 11. It then deduces therefrom that no risk of collision can be predicted.

Now consider the motor vehicle 80.

This considered motor vehicle 80 is traveling on the same east traffic lane 14 as the target motor vehicle 70.

Then, when its driver unit implements the abovementioned two operations, it detects a longitudinal alignment of the motor vehicle considered 80 with the target motor vehicle 70.

Consequently, its driver unit implements a third operation to assess the risk of longitudinal collision between the two motor vehicles 70, 80, given the respective positionings and speeds of these motor vehicles 70, 80.

For this, the driver unit of the motor vehicle considered 80 determines, by virtue in particular of the information 71 transmitted by the target motor vehicle 70:

- whether the two motor vehicles 70, 80 are traveling in the same direction of travel, which is the case here;
- what is the speed difference between these two motor vehicles 70, 80, and
- what is, overall, the distance between the two motor vehicles 70, 80, given the respective GPS positions of these vehicles.

The driver unit of the motor vehicle considered 80 then computes a time before collision between the two vehicles on the assumption that the two vehicles maintain their speeds and remain on the same east traffic lane 14.

As long as the time before collision remains greater than a predetermined threshold stored in its read-only memory, the driver unit does not send any warning.

The time before collision, denoted TAC, can be computed using the following formula: $TAC = TLC_{max} + TRC_{max} + TAR + \epsilon$, in which:

- $TLC_{max}$, or "Maximum Communication Latency Time" takes into account the fact that the received messages provide errored dynamic information linked to the maximum communication time between two vehicles;
- $TRC_{max}$, or "Maximum Driver Reaction Time" takes into account the reaction capabilities of the driver;
- TAR, or "Vehicle Stopping Time" corresponds to the time it takes for the vehicle to stop before the collision as soon as the driver brakes. This time is a function of the braking capabilities of the vehicle, of the braking energy developed by the driver and, where appropriate, of the rules or standards concerning acceptable maximum decelerations;
- $\epsilon$ represents a safety time margin that takes into account the longitudinal positioning errors and the lengths of the vehicles.

On the other hand, as soon as this time before collision becomes less than or equal to the predetermined threshold, the driver unit of the motor vehicle considered 80 implements a fourth operation.

This fourth operation consists either in generating a passive warning signal to alert the driver of the motor vehicle considered 80, or in generating an active control signal for a member of the motor vehicle considered 80 to avoid the collision.

It consists here in sending audible warnings to warn the driver of the motor vehicle considered 80.

As a variant, the driver unit could act otherwise. It could for example accompany the audible warnings with visual or haptic warnings.

It could for example undertake an action to avoid longitudinal collision between the two motor vehicles 70, 80 by actuating the braking system of the motor vehicle considered 80. A collision between the two motor vehicles 70, 80 would thus be avoided.

It would also be possible to provide for the driver unit to act on the steering system of the motor vehicle considered 80 in such a way that the latter changes traffic lane to be positioned in the east traffic lane 13 of the highway 10.

FIG. 2 shows the subject motor vehicle 20 traveling on a highway 10 comprising only two traffic lanes 11 and 13. As represented in this figure, the two traffic lanes 11 and 13 are separated by a ground marking 18 consisting of a discontinuous line allowing overtaking. Also represented is another motor vehicle, that will be called target motor vehicle 30.

The two subject and target motor vehicles 20, 30 are traveling in opposite directions on the highway 10: the subject motor vehicle 20 is traveling in the west traffic lane 11 (arrow to the left) and the target motor vehicle 30 is traveling in the east traffic lane 13 (arrow to the right).

It is then possible to describe, with reference to this FIG. 2, how the abovementioned method for detecting a risk of collision is implemented.

During the first operation, the driver units of the two subject and target motor vehicles 20, 30 determine the traffic lanes 11, 13 on which these vehicles are located.

During the second operation, the driver unit of the subject motor vehicle 20 receives and processes the messages 31 sent by the driver unit of the target motor vehicle 30.

In this case, here, it detects that the target motor vehicle 30, which is the only one situated in proximity to the subject motor vehicle 20, is not situated on its west traffic lane 11. It then deduces therefrom that no risk of collision is to be predicted.

In this configuration, the driver unit of the subject motor vehicle 20 can, prior to the second operation, check that the information that it has determined during the first operation is correct.

Having in effect acquired, by virtue of the global digital map 25, the fact that the subject motor vehicle 20 is located on a two-way highway 10, it can detect, by virtue of the successive GPS positions of the two vehicles, that the target motor vehicle 30 approaches the subject motor vehicle 20 in the opposite direction then moves away. It can then deduce therefrom, with certainty, that the subject motor vehicle 20 has just passed the target motor vehicle 30. Now, according to the information 31 received, the target motor vehicle 30 is located on the east traffic lane 13. It can therefore deduce therefrom that the subject motor vehicle 20 is positioned in the west traffic lane 11.

In the event of inconsistency between the result of the first operation and the result of this operation, the method is reinitialized until the results agree.

FIG. 3 represents a highway 10 identical to that represented in FIG. 1.

The subject motor vehicle 20 and the target motor vehicle 30 travel this time in the same direction, respectively on the east traffic lane 14 and on the east traffic lane 13.

It is then possible to describe, with reference to this FIG. 3, how the abovementioned method for detecting a risk of collision is implemented by the subject motor vehicle 20.

During the first operation, the driver units of the two subject and target motor vehicles 20, 30 determine the traffic lanes 11, 13 on which these vehicles are located.

During the second operation, the driver unit of the subject motor vehicle 20 receives and processes the messages 31 sent by the driver unit of the target motor vehicle 30.

In this case, here, it detects that the target motor vehicle 30 is not situated on its west traffic lane 11. It then deduces therefrom that no risk of collision is to be predicted.

In this configuration, the driver unit of the subject motor vehicle 20 can, prior to the second operation, check that the information it has determined during the first operation is correct.

When the driver unit of the subject motor vehicle 20 detects that the target motor vehicle 30 approaches in the same direction of travel then moves away, it can in effect deduce therefrom, with certainty, that the subject motor vehicle 20 has just been overtaken by the target motor vehicle 30. This information is then used to confirm that the subject motor vehicle 20 is traveling in the traffic lane closest to the first roadside 15, in the east direction.

In the event of inconsistency between the result of the first operation and the result of this operation, the method is reinitialized until the results agree.

FIG. 3 also shows a second target motor vehicle 50 and a second subject motor vehicle 60 traveling on the highway 10, in the same direction, in the west direction.

It is then possible to describe, with reference to this FIG. 3, how the abovementioned method for detecting a risk of collision is implemented by the second subject motor vehicle 60.

During the first operation, the driver units of the two second subject and target motor vehicles 50, 60 determine the traffic lanes 11, 12 on which these vehicles are located.

During the second operation, the driver unit of the second subject motor vehicle 60 receives and processes the messages 51 sent by the driver unit of the second target motor vehicle 50.

In this case, here, it detects that the second target motor vehicle 50 is not situated on its west traffic lane 11.

However, based on the situation represented in FIG. 3, the driver of the second target motor vehicle 50 decides to change traffic lane and move back into the west traffic lane 11 closest to the second roadside 16. For this, it actuates its right indicators 52, 53 and, shortly after, modifies the angle of the steering wheel in order to modify its trajectory and go back into the west traffic lane 11.

Since the driver unit of the second subject motor vehicle 60 has access to the vehicle parameters of the second target motor vehicle 50 (actuation of the indicators, steering wheel angle, etc.) by virtue of the information 51 sent by the latter, it can deduce therefrom a change of traffic lane of the second target motor vehicle 50 to the right. Since the highway 10 comprises only two west traffic lanes 11, 12, then the driver unit of the second subject motor vehicle 60 can deduce therefrom that the second target motor vehicle 50 has just positioned itself in the west traffic lane 11 closest to the second roadside 16. It can also thus check that the second subject motor vehicle 60 is indeed in the west traffic lane 11, as it had detected in the first operation.

Thus, at the end of the change of traffic lane of the second target motor vehicle 50, the second subject motor vehicle 60 and the second target motor vehicle 50 are positioned in the same traffic lane 11 of the highway 10.

Their driver units, which detect the longitudinal alignment of these two vehicles, then implement the third operation of detection of a risk of collision between the two vehicles, in the same way as that described above.

The present invention is in no way limited to the embodiments described and represented, but a person skilled in the art will be able to add thereto any variant that is in accordance with its idea.

In particular, provision could be made for the acquisition means making it possible to acquire a datum relating to the direction of travel of the motor vehicle to be without a compass, but, on the contrary, to consist of the navigation system duly programmed to this end. Provision could in effect be made for this navigation system to store at least two successive GPS positions of the motor vehicle on the highway, and for it to deduce therefrom the direction of travel of the motor vehicle.

The core of the invention, which consists in detecting the traffic lane on which the motor vehicle is located, could also find other applications different from that explained previously.

The invention could for example be used to display, on the screen of the navigation system, a faithful representation of the environment of the vehicle, with an image of the highway showing the real number of traffic lanes, and an image of the vehicle accurately positioned on the traffic lane corresponding to its real position.

The invention could also be incorporated in an accidental line crossing warning system (better known by the acronym LKA, which stands for "Lane Keeping Aid"), making it possible to keep the motor vehicle in its traffic lane.

The method for detecting the longitudinal alignment of the subject motor vehicle with another motor vehicle could also be used for other applications.

As an example, when two vehicles detect that they are on the same traffic lane and that they are traveling substantially at the same speed, provision could be made for the use of inexpensive directional communication techniques such as those that use light-emitting diodes (LEDs) in order to develop other applications based on vehicle-to-vehicle communications.

The invention is not limited to the integration of the data supplied by the GPS but by other systems of satellite geolocation type, called "GNSS" (Global Navigation Satellite System) systems, for example the Russian GLONASS system or the European GALILEO system.

It should be noted that it is the general principle of the cooperative systems to continuously exchange information not only to detect changes of behavior of the other vehicles, but also to act accordingly.

The invention claimed is:

1. A method for determining a positioning of a subject motor vehicle in a traffic lane of a highway, comprising:
    a) acquiring a number of traffic lanes of the highway;
    b) acquiring an image of the highway showing at least a lateral part of the highway;
    c) acquiring a datum relating to a direction of travel of the subject motor vehicle on the highway;
    d) receiving by the subject motor vehicle at least one message from at least one other motor vehicle, the message including a first information item relating to a positioning of the other motor vehicle in one of the traffic lanes of the highway, and a second information item relating to a direction of travel of the other motor vehicle on the highway; and
    e) deducting the positioning of the subject motor vehicle in one of the traffic lanes of the highway, as a function of the number of traffic lanes, the datum relating to the direction of travel, the acquired image, the first information item, and the second information item.

2. The determination method as claimed in claim 1, wherein the second information item is a heading.

3. The determination method as claimed in claim 1, wherein the second information item comprises at least two successive geolocation coordinates of the other motor vehicle.

4. The determination method as claimed in claim 1, wherein, in a), the subject motor vehicle receives and processes a signal which is sent by a roadside unit and which comprises at least the number of traffic lanes of the highway.

5. The determination method as claimed in claim 1, wherein,
    prior to e), further comprising acquiring a change of traffic lane datum of the subject motor vehicle on the highway, and
    in e), the positioning of the subject motor vehicle in one of the traffic lanes of the highway is deduced as a function also of the change of traffic lane datum of the subject motor vehicle on the highway.

6. A method for determining a positioning of a subject motor vehicle in a traffic lane of a highway, comprising:

a) acquiring a number of traffic lanes of the highway;
b) acquiring an image of the highway showing at least a lateral part of the highway;
c) acquiring a datum relating to a direction of travel of the subject motor vehicle on the highway, wherein the datum relating to the direction of travel is at least one of a first longitudinal direction and a second longitudinal direction opposite to the first longitudinal direction; and
d) deducing the positioning of the subject motor vehicle in one of the traffic lanes of the highway, as a function of the number of traffic lanes, the datum relating to the direction of travel, and the acquired image.

7. The determination method as claimed in claim 6, wherein, in a), there are provided:
an operation of acquiring geolocation coordinates of the subject motor vehicle,
an operation of reading a global digital map in which roads are stored, and, for each highway, a corresponding number of traffic lanes, and
an operation of deducing the number of traffic lanes of the highway as a function of the acquired geolocation coordinates and of the global digital map read.

8. The determination method as claimed in claim 6, wherein, in a), the subject motor vehicle receives and processes a signal which is sent by a roadside unit and which comprises at least the number of traffic lanes of the highway.

9. A method of detecting longitudinal alignment between a first subject motor vehicle and a second subject motor vehicle, comprising:
an operation of determining a positioning of the first subject motor vehicle and a second subject motor vehicle in traffic lanes of a highway by a determination method as claimed in claim 6;
an operation of sending, by the first subject motor vehicle, and receiving by the second subject motor vehicle, a message including the positioning of the first subject motor vehicle in one of the traffic lanes of the highway, and
if the second subject motor vehicle and the first subject motor vehicle are positioned in a same traffic lane of the highway, an operation of detecting a longitudinal alignment of the first and second subject motor vehicles.

10. A method of detecting a risk of longitudinal collision between a first subject motor vehicle and a second subject motor vehicle, comprising:
an operation of detecting, by the second subject motor vehicle, a longitudinal alignment with the first subject motor vehicle by a method of detecting longitudinal alignment as claimed in claim 9;
an operation of sending, by the first subject motor vehicle, and receiving by the second subject motor vehicle, a message including a speed and a direction of travel of the first subject motor vehicle;
acquiring, by the second subject motor vehicle, its speed and its direction of travel; and
if a longitudinal alignment is detected between the first subject motor vehicle and the second subject motor vehicle, an operation of detecting a risk of collision between the first subject motor vehicle and the second subject motor vehicle as a function of the respective positionings, speeds, and directions of travel of the first and second subject motor vehicles.

11. A method for determining a positioning of a subject motor vehicle in a traffic lane of a highway, comprising:
a) acquiring a number of traffic lanes of the highway;
b) acquiring an image of the highway showing at least a lateral part of the highway;
c) acquiring a datum relating to a direction of travel of the subject motor vehicle on the highway;
d) receiving by the subject motor vehicle at least one message from at least one other motor vehicle, the message including a first information item relating to a positioning of the other motor vehicle in one of the traffic lanes of the highway, and a second information item relating to a direction of travel of the other motor vehicle on the highway;
e) acquiring a change of traffic lane datum of the subject motor vehicle on the highway; and
f) deducting the positioning of the subject motor vehicle in one of the traffic lanes of the highway, as a function of the number of traffic lanes, the datum relating to the direction of travel, the acquired image, the first information item, the second information item, and change of traffic lane datum of the subject motor vehicle on the highway.

* * * * *